United States Patent
Bassi et al.

(10) Patent No.: US 11,414,506 B2
(45) Date of Patent: Aug. 16, 2022

(54) PROCESS FOR MANUFACTURING A FLUOROPOLYMER

(71) Applicant: SOLVAY SPECIALTY POLYMERS ITALY S.P.A., Bollate (IT)

(72) Inventors: Mattia Bassi, Milan (IT); Alessio Marrani, Lecco (IT); Fulvia Roncati, Alessandria (IT); Eliana Ieva, Alessandria (IT); Valeriy Kapelyushko, Alessandria (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 283 days.

(21) Appl. No.: 16/604,862

(22) PCT Filed: Apr. 9, 2018

(86) PCT No.: PCT/EP2018/058999
§ 371 (c)(1),
(2) Date: Oct. 11, 2019

(87) PCT Pub. No.: WO2018/189090
PCT Pub. Date: Oct. 18, 2018

(65) Prior Publication Data
US 2021/0130518 A1 May 6, 2021

(30) Foreign Application Priority Data
Apr. 11, 2017 (EP) .................... 17165867

(51) Int. Cl.
*C08F 214/22* (2006.01)
*C08F 214/26* (2006.01)
*C08F 2/30* (2006.01)
*C09D 127/18* (2006.01)
*C08F 114/26* (2006.01)
*C08L 27/18* (2006.01)
*F16L 11/04* (2006.01)
*C08J 3/05* (2006.01)
*C08J 5/18* (2006.01)

(52) U.S. Cl.
CPC ............ *C08F 214/262* (2013.01); *C08F 2/30* (2013.01); *C08F 114/26* (2013.01); *C08F 214/22* (2013.01); *C08J 3/05* (2013.01); *C08L 27/18* (2013.01); *C09D 127/18* (2013.01); *F16L 11/04* (2013.01); *C08F 214/222* (2013.01); *C08F 214/26* (2013.01); *C08F 2800/10* (2013.01); *C08J 5/18* (2013.01); *C08L 2201/52* (2013.01); *C08L 2203/18* (2013.01)

(58) Field of Classification Search
None
See application file for complete search history.

(56) References Cited

U.S. PATENT DOCUMENTS

| | | | |
|---|---|---|---|
| 4,990,283 A | 2/1991 | Visca et al. | |
| 5,498,680 A | 3/1996 | Abusleme et al. | |
| 6,103,843 A | 8/2000 | Abusleme et al. | |
| 6,136,933 A * | 10/2000 | Jones | C08F 14/26 526/242 |
| 2005/0096442 A1 * | 5/2005 | Thaler | C08F 214/18 526/255 |
| 2016/0039959 A1 * | 2/2016 | Hintzer | C09D 127/18 524/546 |

FOREIGN PATENT DOCUMENTS

| | | |
|---|---|---|
| EP | 2868674 A1 | 5/2015 |
| JP | 2017057379 A | 3/2017 |
| WO | 2002028925 A1 | 4/2002 |
| WO | 2002088207 A1 | 11/2002 |
| WO | 2005044878 A1 | 5/2005 |
| WO | 2016099913 A1 | 6/2016 |

OTHER PUBLICATIONS

Standard ASTM D1238-04, "Standard Test Method for Melt Flow Rates of Thermoplastics by Extrusion Plastometer", 2004, p. 1-13.
Standard ISO 13321—Particle size analysis—Photon correlation spectroscopy—Jul. 1, 1996—p. 1-20.
Madorskaya L.Y. et al., "Features of copolymerization of vinylidene fluoride with tetrafluoroethylene using ammonium persulphate", Polymer Science USSR, 1986, vol. 28, issue 5, p. 1062-1071—Pergamon Journals Ltd.

* cited by examiner

*Primary Examiner* — Richard A Huhn
(74) *Attorney, Agent, or Firm* — Osha Bergman Watanabe & Burton LLP

(57) ABSTRACT

The present invention pertains to a process for manufacturing a semi-crystalline fluoropolymer, to the fluoropolymer obtainable by said process and to uses of said fluoropolymer in various applications.

13 Claims, No Drawings

PROCESS FOR MANUFACTURING A FLUOROPOLYMER

CROSS-REFERENCE TO RELATED APPLICATIONS

This application is a U.S. national stage entry under 35 U.S.C. 071 of International Application No. PCT/EP2018/058999 filed Apr. 9, 2018, which claims priority to European application No. EP 17165867.7, filed on Apr. 11, 2017. The entire contents of these applications are explicitly incorporated herein by this reference.

TECHNICAL FIELD

The present invention pertains to a process for manufacturing a fluoropolymer, to the fluoropolymer obtainable by said process and to uses of said fluoropolymer in various applications.

BACKGROUND ART

Fluoropolymers are known in the art which are endowed with both high mechanical resistance and high chemical resistance to be suitably used in various applications.

Various attempts have been made in the art to obtain fluoropolymer compositions suitable for use in various applications such as coating applications.

JP 2017/057379 (Daikin Industries) 23 Mar. 2017, pertains to a process for polymerizing tetrafluoroethylene and vinylidene fluoride in an aqueous medium in presence of at least one surfactant selected from fluorinated and non-fluorinated surfactants. In all the examples, JP 2017/057379 discloses the polymerization of tetrafluoroethylene and vinylidene fluoride in the presence of a reactive fluorine-containing allyl ether anionic surfactant, namely the compound of formula $CH_2=CFCF_2-O-(CF(CF_3)CF_2O)-CF(CF_3)-COONH_4$, and of the short chain fluorine-containing anionic surfactant of formula $F(CF_2)-COONH_4$. Polymerization in the presence of reactive ionic surfactants results in polymers that comprise a plurality of ionic pendant groups. A serious disadvantage of having those ionic groups bound to the polymer backbone is the reduced thermal stability of the resulting polymer.

However, there is still a need in the art for melt-processable fluoropolymers and compositions thereof endowed with low melting points and high thermal stability, which may be obtainable by an efficient and cost-effective process.

SUMMARY OF INVENTION

It has been now surprisingly found that the process of the invention advantageously enable providing a fluoropolymer which is easily processable, typically in molten phase.

The fluoropolymer of the present invention can be advantageously endowed with a high molecular weight to be suitably used in various applications where outstanding mechanical properties, in particular at high temperatures, are required.

In particular, it has been found that the process of the invention is advantageously carried out in the absence of surfactants while providing aqueous latexes which may be advantageously concentrated into aqueous dispersions suitable for use in various applications, especially in coating applications. The absence of surfactants in the polymerization process, of reactive fluorinated surfactants in particular, besides the environmental advantages, results in a polymer having improved thermal stability in comparison with polymers obtained by polymerization processes in the presence of reactive surfactants bearing ionic pendant groups.

Also, it has been found that the aqueous latex of the invention, as compared to aqueous latexes comprising fully fluorinated fluoropolymers such as tetrafluoroethylene homopolymers and copolymers with perfluoroalkylvinylethers, advantageously provides for coatings having a higher hardness at a relatively lower film forming temperature in combination with a higher chemical and thermal resistance.

In a first instance, the present invention pertains to a process for manufacturing a semi-crystalline fluoropolymer [polymer (F)] comprising:

more than 50% by moles, preferably from 51% to 70% by moles, more preferably from 55% to 65% by moles, even more preferably from 60% to 65% by moles of recurring units derived from tetrafluoroethylene (TFE), and less than 50% by moles, preferably from 49% to 30% by moles, more preferably from 45% to 35% by moles, even more preferably from 40% to 35% by moles of recurring units derived from vinylidene fluoride (VDF), wherein the molar amounts of said recurring units are relative to the total moles of recurring units in said polymer (F), said process being carried out by emulsion polymerization in an aqueous polymerization medium without addition of one or more surfactants.

The process of the invention is typically carried out in the presence of:

at least one radical initiator, and optionally, at least one chain transfer agent.

The process of the invention is typically initiated by at least one radical initiator without addition of one or more surfactants.

Also, no surfactant is added during the process of the invention.

The process of the invention is typically carried out at a pressure comprised between 10 bar and 35 bar, preferably between 11 bar and 25 bar.

The skilled in the art will choose the polymerization temperature having regards, inter alia, of the radical initiator used. The process of the invention is typically carried out at a temperature comprised between 50° C. and 135° C., preferably between 55° C. and 130° C.

While the choice of the radical initiator is not particularly limited, it is understood that water-soluble radical initiators suitable for aqueous emulsion polymerization are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butyl-per-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)—[CF(CF_3)CF_2O]_m—CF(CF_3)—COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^¤N=NR^¤$, where $R^¤$ is a linear or branched perfluorocarbon group having 1-8 carbons; stable or hindered perfluoroalkane radicals such as hexafluoropropylene trimer radical, $[(CF_3)_2CF]_2(CF_2CF_2)C.$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), ditertbutylperoxyisopropylcarbonate, tertbutyl(2-ethyl-hexyl)peroxycarbonate, tert-butylperoxy-3,5,5-trimethylhexanoate.

One or more radical initiators as defined above may be added to the aqueous polymerization medium of the process of the invention in an amount ranging advantageously from 0.001% to 20% by weight based on the weight of the aqueous polymerization medium.

The process of the invention is typically carried out in the presence of at least one chain transfer agent.

The chain transfer agent is generally selected from those known in the polymerization of fluorinated monomers such as ethane, ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl)carbonate, bis(isobutyl)carbonate. The chain transfer agent may be fed to the aqueous medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) Feb. 5, 1991, U.S. Pat. No. 5,498,680 (AUSIMONT S.P.A.) Mar. 12, 1996 and U.S. Pat. No. 6,103,843 (AUSIMONT S.P.A.) Aug. 15, 2000).

In a second instance, the present invention pertains to a semi-crystalline fluoropolymer [polymer (F)] obtainable by the process of the invention.

The polymer (F) of the invention is advantageously melt-processable. The term "melt-processable" is hereby intended to denote a fluoropolymer which can be processed by conventional melt-processing techniques.

The polymer (F) of the invention typically has a melting point $(T_m)$ comprised between 170° C. and 300° C., preferably between 190° C. and 280° C.

The semi-crystalline polymer (F) is typically recovered from an aqueous latex obtainable by the process of the invention.

The semi-crystalline polymer (F) of the invention may further comprise recurring units derived from at least one fluorinated monomer different from tetrafluoroethylene (TFE) and vinylidene fluoride (VDF).

For the purpose of the present invention, the term "fluorinated monomer" is intended to denote an ethylenically unsaturated monomer comprising at least one fluorine atom.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:
- $C_3$-$C_8$ perfluoroolefins such as hexafluoropropylene (HFP);
- $C_2$-$C_8$ hydrogenated fluoroolefins such as vinyl fluoride, 1,2-difluoroethylene and trifluoroethylene;
- perfluoroalkylethylenes of formula $CH_2=CH—R_{f0}$, wherein $R_{f0}$ is a $C_1$-$C_6$ perfluoroalkyl group;
- chloro- and/or bromo- and/or iodo-$C_2$-$C_6$ fluoroolefins such as chlorotrifluoroethylene;
- (per)fluoroalkylvinylethers of formula $CF_2=CFOR_{f1}$, wherein $R_{f1}$ is a $C_1$-$C_6$ fluoro- or perfluoroalkyl group, e.g. $CF_3$, $C_2F_5$, $C_3F_7$;
- $CF_2=CFOX_0$ (per)fluoro-oxyalkylvinylethers, wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;
- (per)fluoroalkylvinylethers of formula $CF_2=CFOCF_2OR_{f2}$, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $—C_2F_5—O—CF_3$;
- functional (per)fluoro-oxyalkylvinylethers of formula $CF_2=CFOY_0$, wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;
- bis-olefins of formula $R_AR_B=CR_C$-T-$CR_D=R_ER_F$, wherein $R_A$, $R_B$, $R_C$, $R_D$, $R_E$ and $R_F$, equal to or different from each other, are selected from the group consisting of H, F, Cl, $C_1$-$C_6$ alkyl groups and $C_1$-$C_6$ (per)fluoroalkyl groups, and T is a linear or branched $C_1$-$C_{18}$ alkylene or cycloalkylene group, optionally comprising one or more ether oxygen atoms, preferably at least partially fluorinated, or a (per)fluoropolyoxyalkylene group, e.g. $CH_2=CH—(CF_2)_6—CH=CH_2$;
- (per)fluoro-bis-vinylethers; and
- fluorodioxoles, preferably perfluorodioxoles.

The semi-crystalline polymer (F) of the invention typically further comprises recurring units derived from at least one perfluoroalkylvinylether (PAVE) of formula (I):

wherein $R_f$ is a $C_1$-$C_6$ alkyl group or a $C_1$-$C_6$ (per)fluoroalkyl group.

The semi-crystalline polymer (F) of the invention preferably further comprises from 0.1% to 5% by moles, preferably from 1% to 5% by moles, more preferably from 1.5% to 3.5% by moles of recurring units derived from at least one perfluoroalkylvinylether (PAVE) of formula (I):

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F).

The semi-crystalline polymer (F) of the invention preferably comprises, more preferably consists of:
 more than 50% by moles, preferably from 55% to 65% by moles of recurring units derived from tetrafluoroethylene (TFE),
 less than 50% by moles, preferably from 40% to 30% by moles of recurring units derived from vinylidene fluoride (VDF), and
 optionally, from 0.1% to 5% by moles, preferably from 1% to 5% by moles, more preferably from 1.5% to 3.5% by moles of recurring units derived from at least one perfluoroalkylvinylether (PAVE) of formula (I):

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F).

The perfluoroalkylvinylether (PAVE) of formula (I) is typically selected from the group consisting of perfluoromethylvinylether (PMVE) of formula $CF_2=CF-O-CF_3$, perfluoroethylvinylether (PEVE) of formula $CF_2=CF-O-CF_2-CF_3$ and perfluoropropylvinylether (PPVE) of formula $CF_2=CF-O-CF_2-CF_2-CF_3$.

In a third instance, the present invention pertains to an aqueous latex comprising at least one semi-crystalline polymer (F) as defined above, said polymer (F) comprising:
 more than 50% by moles, preferably from 51% to 70% by moles, more preferably from 55% to 65% by moles, even more preferably from 60% to 65% by moles of recurring units derived from tetrafluoroethylene (TFE), and
 less than 50% by moles, preferably from 49% to 30% by moles, more preferably from 45% to 35% by moles, even more preferably from 40% to 35% by moles of recurring units derived from vinylidene fluoride (VDF),
wherein the molar amounts of said recurring units are relative to the total moles of recurring units in said polymer (F),
wherein the polymer (F) in the aqueous latex is in the form of primary particles having an average primary particle size of less than 1 μm, preferably of less than 600 nm, as measured according to ISO 13321.

The aqueous latex of the invention preferably comprises from 1% to 25% by weight, preferably from 5% to 20% by weight of at least one semi-crystalline polymer (F), with respect to the total weight of said aqueous latex.

The aqueous latex of the invention advantageously comprises at least one semi-crystalline polymer (F) preferably under the form of primary particles having an average primary particle size comprised between 50 nm and 450 nm, preferably between 200 nm and 300 nm, as measured according to ISO 13321.

For the purpose of the present invention, by "average primary particle size" it is intended to denote the average size of primary particles of polymer (F) obtainable by aqueous emulsion polymerization.

For the purpose of the present invention, "primary particles" of polymer (F) are intended to be distinguishable from agglomerates of primary particles.

Aqueous latexes comprising primary particles of polymer (F) are advantageously obtainable by aqueous emulsion polymerization. Agglomerates of primary particles of polymer (F) are typically obtainable by recovery and conditioning steps of polymer (F) manufacture such as concentration and/or coagulation of aqueous polymer (F) latexes and subsequent drying and homogenization thereby providing solid powders of polymer (F).

The aqueous latex obtainable by the process of the invention is thus intended to be distinguishable from an aqueous slurry prepared by dispersing polymer (F) powders in an aqueous medium. The average particle size of polymer (F) powders dispersed in an aqueous slurry is typically higher than 1 μm, as measured according to ISO 13321.

The aqueous latex obtainable by the process of the invention advantageously has homogeneously dispersed therein primary particles of at least one polymer (F) having an average primary particle size comprised between 50 nm and 450 nm, preferably between 200 nm and 300 nm, as measured according to ISO 13321.

The aqueous latex of the invention may be up-concentrated thereby providing an aqueous dispersion.

The present invention thus also pertains to a process for manufacturing an aqueous dispersion, said process comprising up-concentrating the aqueous latex of the invention.

The aqueous latex of the invention is typically up-concentrated according to any techniques known in the art such as, for instance, via clouding, typically in the presence of salts such as KNOB.

The process for manufacturing an aqueous dispersion of the invention typically comprises:
 providing a mixture comprising the aqueous latex of the invention and least one hydrogenated surfactant [surfactant (H)], and
 up-concentrating the mixture so obtained thereby providing an aqueous dispersion.

The aqueous dispersion of the invention typically comprises:
 up to 35% by weight, preferably from 1% to 35% by weight of at least one semi-crystalline polymer (F), with respect to the total weight of said aqueous dispersion, and
 optionally, at least one hydrogenated surfactant [surfactant (H)].

The aqueous dispersion of the invention typically comprises from 1% to 5% by weight of at least one hydrogenated surfactant [H], with respect to the total weight of said aqueous dispersion.

For the purpose of the present invention, "hydrogenated surfactant [H]" it is intended to denote an amphiphilic organic compound containing both hydrophobic groups and hydrophilic groups.

The surfactant (H) may be an ionic hydrogenated surfactant [surfactant (IS)] or a non-ionic hydrogenated surfactant [surfactant (NS)].

Non-limiting examples of suitable surfactants (IS) include, notably, 3-allyloxy-2-hydroxy-1-propane sulfonic acid salts, polyvinylphosphonic acid salts, polyacrylic acid salts, polyvinyl sulfonic acid salts and alkyl phosphonates.

The surfactant (H) is preferably a surfactant (NS).

Non-limiting examples of suitable surfactants (NS) include, notably, octylphenol ethoxylates and fatty alcohol polyethers comprising recurring units derived from ethylene oxide and/or propylene oxide.

The surfactant (NS) has generally a cloud point of advantageously 50° C. or more, preferably of 55° C. or more, as measured according to EN 1890 standard (method A: 1% by weight water solution).

The surfactant (NS) is preferably selected from the group consisting of non-ionic hydrogenated surfactants commercially available under the trademark names TERGITOL®, TRIXON® X and PLURONIC®.

In a further instance, the present invention pertains to use of the aqueous latex or the aqueous dispersion of the invention in various applications.

In particular, the aqueous latex or the aqueous dispersion of the invention is particularly suitable for use in a process for manufacturing a film.

The film of the invention typically comprises at least one semi-crystalline polymer (F) as defined above.

According to a first embodiment of the invention, the present invention pertains to a process for manufacturing the film of the invention, said process comprising processing the aqueous latex or the aqueous dispersion of the invention typically by casting, spraying or dipping. The film so obtained is then typically dried.

According to a second embodiment of the invention, the present invention pertains to a process for manufacturing the film of the invention, said process comprising:

coagulating the aqueous latex or the aqueous dispersion of the invention followed by drying thereby providing solid powders of polymer (F), and processing the solid powders of polymer (F) so obtained, optionally in the presence of at least one lubricant, thereby providing a film.

Processing of the solid powders of polymer (F) is typically carried out by ram extrusion, preferably by paste extrusion, or by calendering.

Processing of the solid powders of polymer (F) may be carried out in molten phase.

Processing of the solid powders of polymer (F), typically by ram extrusion or by calendering, is advantageously carried out at a temperature below the melting point of the polymer (F) of the invention.

The process according to this second embodiment of the invention may further comprise:

expanding the film of the invention, typically in one or more directions, thereby providing an expanded film, and optionally, heat treating the expanded film so obtained.

Expansion of the film of the invention is advantageously carried out at a temperature below the melting point of the polymer (F) of the invention.

Heat treatment of the expanded film of the invention may be carried out at a temperature above the melting point of the polymer (F) of the invention.

The expanded film of the invention is typically porous.

It has been found that the expanded film of the invention advantageously has outstanding mechanical properties.

The film of the invention is suitable for use in various applications such as oil and gas applications, automotive applications and coating applications.

The expanded film of the invention is suitable for use in various applications such as water filtration, dialysis, battery separators, vents, desalinization and gas separation. The expanded film of the invention is also suitable for use in textile fabrics.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-1): TFE (60% mol)-VDF (40% mol) copolymer.

Measurement of the Second Melting Temperature

The melting point was determined by differential scanning calorimetry (DSC) according to ASTM D 3418 standard method. The endothermic peak observed during the first heating was integrated to obtain the melt enthalpy DH of the polymer. The second melting temperature, defined as the maximum of the endothermic peak observed during the second heating period, was recorded and is hereby referred to as the melting point ($T_m$) of the polymer.

General Procedure for the Manufacture of Polymer (F-1)

In an AISI 316 steel 90 liter vertical autoclave, equipped with baffles and a stirrer working at 170 rpm, 66 liter of demineralized water were introduced. The temperature was then brought to reaction temperature of 80° C. and, when this temperature was reached, 2 bar of vinylidene fluoride were introduced.

A gaseous mixture of TFE-VDF in the molar nominal ratio of 60:40 was subsequently added via a compressor until reaching a pressure of 12 bar. Then, 500 ml of a 6% by weight water solution of sodium persulfate (NaPS) as initiator was fed. The polymerization pressure was maintained constant by feeding the above mentioned TFE-VDF mixture. When 8000 g of the mixture were fed, the reactor was cooled at room temperature, the latex was discharged. The latex was then frozen for 48 hours and, once unfrozen, the coagulated polymer was washed with demineralized water and dried at 160° C. for 16 hours. The melting temperature Tm and the melt enthalpy DH of the obtained semi-crystalline polymer where respectively Tm=225, DH=35 J/g

EXAMPLE 1

The aqueous latex obtained by the process for manufacturing the polymer (F-1) as detailed above has been treated by addition of TERGITOL® TMN-100X branched secondary alcohol ethoxylate surfactant and then concentrated via clouding in the presence of $KNO_3$ thereby providing an aqueous dispersion comprising 46.9% by weight of the polymer (F-1) and 2.8% by weight of TERGITOL® TMN-100X branched secondary alcohol ethoxylate surfactant, with respect to the total weight of said aqueous dispersion. The aqueous dispersion is free from one or more fluorinated surfactants.

A film has been obtained by casting the aqueous dispersion so obtained onto a substrate and drying at room temperature followed by thermal treatment at 260° C. for 10 minutes.

COMPARATIVE EXAMPLE 1

A film has been obtained by casting an aqueous dispersion comprising HYFLON® D5510 TFE/PMVE copolymer onto a substrate and drying at room temperature followed by thermal treatment at 320° C. for 10 minutes.

Measurement of the Hardness

The pendulum damping test has been used following ASTM D4366 standard procedure (test method A—König Pendulum Hardness) to detect differences in coating hardness of the film, where hardness is defined as resistance to its deformation. The amplitude of oscillation of a pendulum touching a surface decreases more rapidly the softer the surface of the film.

Measurement of the Film Forming Temperature

The aqueous latex was casted on a substrate, dried at room temperature and then baked at high temperature for 10 minutes. Different trials were performed, carrying out the baking step at increasing temperature, starting from 200° C., until a good film formation was detected, i.e. no cracks and particles coalescence.

Measurement of the Chemical Resistance to HCl

Apply 10 drops of a 10% (by volume) solution of 37% hydrochloric acid in tap water and cover it with a watch glass. After 15 minutes exposure, washed off with running tap water and check the presence of no blistering or any other visual change.

Measurement of the Chemical Resistance to $HNO_3$

Place the test panel completely over the mouth of one-half full bottle of 70% nitric acid for 30 minutes. Rinse the sample with tap water and check any visual change after one-hour recovery period.

The results are set forth in Table 1 here below:

TABLE 1

| Run | Hardness | Film forming ability [T, ° C.] | Chemical resistance [HCl, $HNO_3$] |
|---|---|---|---|
| Ex. 1 | 53 | 260 | positive |
| C. Ex. 1 | 42 | 320 | positive |

In view of the above, it has been found that the aqueous latex of the invention, which is advantageously free from one or more surfactants, as compared to aqueous latexes comprising fully fluorinated fluoropolymers such as HYFLON® D5510 TFE/PMVE copolymer, advantageously provides for coatings having a higher hardness at a relatively lower film forming temperature in combination with a high chemical resistance to acids.

The invention claimed is:

1. A process for manufacturing a polymer (F), wherein polymer (F) is a semi-crystalline fluoropolymer comprising:
   from 51% to 70% by moles of recurring units derived from tetrafluoroethylene (TFE), and
   from 49% to 30% by moles of recurring units derived from vinylidene fluoride (VDF),
   wherein the molar amounts of said recurring units are relative to the total moles of recurring units in said polymer (F),
   said process being carried out by emulsion polymerization in an aqueous polymerization medium without addition of one or more surfactants.

2. The process according to claim 1, said process being carried out at a pressure comprised between 10 bar and 35 bar.

3. The process according to claim 2, said process being carried out at a pressure comprised between 11 bar and 25 bar.

4. The process according to claim 1 or 2, wherein the semi-crystalline polymer (F) further comprises recurring units derived from at least one fluorinated monomer different from tetrafluoroethylene (TFE) and vinylidene fluoride (VDF).

5. The process according to claim 1, wherein the semi-crystalline polymer (F) further comprises recurring units derived from at least one perfluoroalkylvinylether (PAVE) of formula (I):

$$CF_2\!=\!CF\!-\!O\!-\!R_f \qquad (I)$$

wherein $R_f$ is a $C_1$-$C_6$ alkyl group or a $C_1$-$C_6$ (per)fluoroalkyl group.

6. The process according to claim 5, wherein the perfluoroalkylvinylether (PAVE) of formula (I) is selected from the group consisting of perfluoromethylvinylether (PMVE) of formula $CF_2\!=\!CF\!-\!O\!-\!CF_3$, perfluoroethylvinylether (PEVE) of formula $CF_2\!=\!CF\!-\!O\!-\!CF_2\!-\!CF_3$ and perfluoropropylvinylether (PPVE) of formula $CF_2\!=\!CF\!-\!O\!-\!CF_2\!-\!CF_2\!-\!CF_3$.

7. The process according to claim 5, wherein the semi-crystalline polymer (F) further comprises from 0.1% to 5% by moles of recurring units derived from at least one perfluoroalkylvinylether (PAVE) of formula (I), wherein the molar amounts of said recurring units are relative to the total moles of recurring units in said polymer (F).

8. The process according to claim 1, wherein the semi-crystalline polymer (F) comprises:
   from 51% to 70% by moles of recurring units derived from tetrafluoroethylene (TFE),
   from 49% to 30% by moles of recurring units derived from vinylidene fluoride (VDF), and
   from 0.1% to 5% by moles of recurring units derived from at least one perfluoroalkylvinylether (PAVE) of formula (I):

$$CF_2\!=\!CF\!-\!O\!-\!R_f \qquad (I)$$

wherein $R_f$ is a $C_1$-$C_6$ alkyl group or a $C_1$-$C_6$ (per)fluoroalkyl group,
   wherein the molar amounts of said recurring units are relative to the total moles of recurring units in said polymer (F).

9. The process according to claim 8, wherein semi-crystalline polymer (F) consists of:
   from 55% to 65% by moles of recurring units derived from tetrafluoroethylene (TFE),
   from 40% to 30% by moles of recurring units derived from vinylidene fluoride (VDF), and
   from 1.5% to 3.5% by moles of recurring units derived from the at least one perfluoroalkylvinylether (PAVE) of formula (I),
   wherein the molar amounts of said recurring units are relative to the total moles of recurring units in said polymer (F).

10. The process according to claim 1, wherein the semi-crystalline polymer (F) has a melt flow index of less than 5 g/10 min as measured according to ASTM D1238 at 300° C. under a load of 5 Kg.

11. The process according to claim 10, wherein the semi-crystalline polymer (F) has a melt flow index of less than 1 g/10 min, as measured according to ASTM D1238 at 300° C. under a load of 5 Kg.

12. The process according to claim 1, wherein polymer (F) is a semi-crystalline fluoropolymer comprising:
   from 60% to 65% by moles of recurring units derived from tetrafluoroethylene (TFE), and
   from 40% to 35% by moles of recurring units derived from vinylidene fluoride (VDF),
   wherein the molar amounts of said recurring units are relative to the total moles of recurring units in said polymer (F).

13. A process for manufacturing a polymer (F), wherein polymer (F) is a semi-crystalline fluoropolymer comprising:

more than 50% by moles of recurring units derived from tetrafluoroethylene (TFE), and less than 50% by moles of recurring units derived from vinylidene fluoride (VDF), wherein the molar amounts of said recurring units are relative to the total moles of recurring units in said polymer (F), said process being carried out by emulsion polymerization in an aqueous polymerization medium without addition of one or more surfactants, wherein the semi-crystalline polymer (F) further comprises recurring units derived from at least one perfluoroalkylvinylether (PAVE) of formula (I):

$$CF_2=CF-O-R_f \qquad (I)$$

wherein $R_f$ is a $C_1$-$C_6$ alkyl group or a $C_1$-$C_6$ (per)fluoroalkyl group, wherein the semi-crystalline polymer (F) further comprises from 1.5% to 3.5% by moles of recurring units derived from at least one perfluoroalkylvinylether (PAVE) of formula (I), wherein the molar amounts of said recurring units are relative to the total moles of recurring units in said polymer (F).

* * * * *